3,337,326
PROCESS FOR PREPARING A SOIL CONDITIONING AND EROSION PREVENTING COMPOSITION FROM SUGAR CANE BAGASSE

Harry M. May, 1717 E. Northside Drive, Jackson, Miss. 39211, and Harry A. Nadler, Jr., Rte. 2, Box 117, Thibodaux, La. 70301
No Drawing. Filed Dec. 28, 1964, Ser. No. 421,681
7 Claims. (Cl. 71—26)

ABSTRACT OF THE DISCLOSURE

A process for producing soil conditioning and erosion preventing compositions from bagasse. The raw bagasse is baled under compression to effect compaction of the bagasse, and the bales are then subjected to weathering for a period of at least thirty days, and until a moisture content not exceeding 20 weight percent is attained. The bagasse is then comminuted to produce a number of bagasse particles which will pass a No. 4 Tyler screen. Water is added to the comminuted bagasse to bring the moisture content thereof to from about 40 to about 70 weight percent. Water addition is followed by a further weathering step in compacted piles for a period of at least thirty days and until the moisture content is decreased to from about 30 to about 60 weight percent. The thus treated bagasse may then be converted to a soil conditioning composition by the addition of nutrients, or it may be utilized in combination with water and wood cellulose fibers to produce a viscous mulching and seed matting composition in slurry form.

---

This application is a continuation-in-part of our United States patent application Ser. No. 251,032 filed Jan. 14, 1963, now Patent No. 3,163,517 and entitled "Method of Preparing a Soil Conditioning Composition from Sugar Can Bagasse."

This invention relates to a composition for conditioning the soil environment of plants so that the rate and uniformity of growth of the plants is improved. In a different aspect, the invention relates to a process for upgrading natural materials yielded as waste or low value by-products through the production of sugar cane.

In yet another aspect, the invention relates to a novel mulching composition useful for planting seeds and vegetative plant parts on flat, inclined and sloped areas, and for preventing soil erosion.

In the production of sugar cane, the cane is compressed or crushed to express or extract therefrom the juices containing the raw sugar. The cane stalks are crushed into cream-colored particles termed bagasse which include more or less equal proportions of moisture and fibers or insoluble solids, and relatively small quantities of various soluble solids. While the general composition of the bagasse varies somewhat according to the particular variety of sugar cane from which it is derived and the area where it is produced, a typical composition of bagasse derived from Louisiana sugar cane is about 49 to about 54 percent by weight moisture, about 45 percent by weight insoluble fibers, and about 6 percent by weight soluble solids.

The water insoluble fibers of the bagasse are comprised largely of cellulose, pentosans (a type of hemicellulose), and lignin. The ratio of these components is roughly 56 percent by weight cellulose, 25 percent by weight pentosans and 19 percent by weight lignin.

The insoluble fibers of the bagasse include two basically different structural types. One of these is composed of the relatively tough, hard-walled cylindrical cells found in the rind and vascular tissues of the cane. The other is composed of the soft, thin-walled, irregularly shaped cells of the inner stalk tissue or pith. These two constitutents of the fiber occur in the general ratio of about 2 to 1 by weight, respectively. Both of the fiber types have a chemical composition, on a dry basis, of about 0.21 percent nitrogen, 0.09 percent phosphorus (phosphorus pentoxide equivalent), 0.21 percent potash ($K_2O$ equivalent) and about 40 percent carbon. Raw bagasse is acidic in nature, having a pH of 4.05 to 5.2.

In our co-pending application, to which reference has hereinbefore been made, a method is disclosed for converting rendered or "bright" bagasse to a valuable and highly useful soil conditioner which does not deleteriously affect the soil to which it is added, and which is generally free of the disadvantages hereinbefore enumerated. Generally, the process disclosed in said patent application comprises increasing the moisture content of the raw bagasse to above about 60 percent, and preferably from 70 to 80 percent (to a substantially saturated state) by adding water thereto, mechanically compressing the bagasse while the bagasse is being stacked in outdoor piles exposed to the elements, permitting the compressed bagasse to remain in such outdoor piles for a period of at least 70 days, during which time it is weathered and undergoes enzymatic and bacteriological conversion, dehydrating the weathered bagasse to a moisture content of from about 10 percent by weight to about 40 percent by weight, physically homogenizing the dehydrated particles of the weathered bagasse to obtain relatively uniform particle size in the weathered bagasse, and finally enriching and chemically balancing the homogenized bagasse particles by the addition of plant nutrients to the relatively physically uniform bagasse particles.

An important aspect of the described process is that the raw bagasse is changed by the process from a chemically non-uniform and unstable material of undesirably high carbon to nitrogen ratio and undesirably low pH to a material of uniform and stable chemical consistency, an improved C–N ratio and near neutral pH by the process of increasing the water content of the bagasse and then compacting the bagasse in large outdoor piles where it is permitted to weather for a period in excess of 70 days.

After the bagasse has been stabilized to a point where it constitutes a chemically stable base material of high organic content, plant nutrients can be added to the base material to bring the concentration of nutrients such as phosphorus and potash to an optimum level. Further reduction in the C–N ratio can be effected by the addition of nitrogen containing chemicals to the stabilized bagasse in order to assure that an orderly activity of soil organisms will transpire, and that a relatively large amount of rich residual humus will be deposited when the bagasse is applied to plants as a soil conditioner.

The present invention is directed to an improvement in the basic process described in said co-pending application resulting from further research and advances in the development of the process. Broadly, the present invention resides in the determination that the bagasse may be chemically stabilized and brought to substantially the same state as that which is attained in the described process without the necessity for separately and positively dehydrating the bagasse after weathering to bring the bagasse to a moisture content of between about 10 percent by weight and 40 percent by weight. It has also been determined that the physical homogenization of the weathered bagasse to obtain relatively uniform particle size so that substantially all of the particles will pass a No. 4 Tyler screen can be accomplished by a hammer milling procedure rather than a screening process. The presence of relatively small bagasse particles in the homogenized product has been found not to detract from the efficacy or usefulness of the product.

Finally, it has been discovered that a highly useful, erosion resistant mulch or seed mat slurry can be produced using the weathered, homogenized bagasse produced by either the present process or the process described in the cited application in combination with a wood cellulose fiber slurry. A slurry of the latter type has previously been in use for mass planting of grass and tree seeds along highways and in areas undergoing reforestation, but has not proved entirely satisfactory due to insufficient adherence to the ground and resistance to removal by erosion. The compositions proposed by the present invention which contain the weathered, homogenized bagasse in addition to the wood cellulose fibers demonstrate much improved "staying power."

Broadly, the process of the present invention comprises baling the bagasse, which in the raw state will contain from about 45 to about 60 percent moisture, with compaction of the bagasse being effected in the baling process so that pressure of from about 100 p.s.i. to about 150 p.s.i. is applied to the bagasse; subjecting the compacted bales to air circulation and weathering for a period of at least 30 days, and until a moisture content of the bagasse of about 20 percent or lower is attained; comminuting or reducing the particle size of the bagasse by hammer milling, grinding or similar procedure so that substantially all of the bagasse will pass a No. 4 Tyler screen; adding water to the bagasse to achieve a relatively uniform moisture content therein of from about 40 percent by weight to about 70 percent by weight; weathering the bagasse in compacted piles for a period of at least 30 days and until the moisture content of the bagasse is decreased by natural or mechanical methods to a level of from about 30 percent to about 60 percent by weight; then, adding inorganic, plant nutrient containing chemicals selected from the group consisting of nitrogenous compounds, phosphorus containing compounds, potassium containing compounds and mixtures of said compounds to the homogenized, weathered bagasse to adjust the chemical content thereof on a dry basis to from about 0.6 to about 1.5 percent by weight nitrogen; about 0.3 to about 1 percent by weight phosphorus pentoxide, and about 0.3 to about 1 percent by weight potash.

In the described improved method of producing an effective, bagasse-base soil conditioner, the econmy with which the process may be practiced is improved in simplified methods, less expensive drying equipment, and the homogenization of the particle size of the bagasse is more economically accomplished by a comminution procedure than by the screening procedure used in the basic process described in said co-pending application. During the first weathering period, the bagasse is partially stabilized, and the sugar residues in the material are partially dissipated. The nitrogen content of the semi-stabilized bagasse is less than 0.35 percent, the phosphorus content is less than 0.1 percent and the potash content is less than 0.25 percent. Final stabilization and dissipation of the sugar residues are accomplished in the final weathering step so that a chemically stable, and physically and chemically uniform base material is produced prior to the addition of the inorganic nutrient materials in the final step of the process.

Either following, or as an alternative to, the step of the procedure in which inorganic nutrients are added to the bagasse, the homogeneous, stable bagasse product can be slurried with wood cellulose fibers to produce a viscous mulching or seed matting composition to form a pumpable slurry which can be sprayed on large areas of soil in grass establishment, reforestation or erosion control projects.

From the foregoing general summary of the invention, it will have become apparent that a major object of the invention is to provide an effective soil conditioning composition which is versatile in its applicability to use on various types of soils, and which produces relatively more uniform plant growth in the soils to which it is applied.

Another object of the invention is to upgrade raw bagasse by converting it to a highly useful soil conditioning composition.

A more specific object of the invention is to convert sugar cane bagasse to a soil conditioning composition having a balanced plant nutrient value, a near neutral pH and a carbon to nitrogen ratio which avoids disorderly activity by soil organisms.

A further object of the invention is to provide a chemically balanced, effective soil conditioner of uniform physical particle size, which soil conditioner is derived from sugar cane bagasse.

A further object of the invention is to provide a simple and relatively economic process for treating raw sugar cane bagasse to convert the material to a composition which is a highly effective soil conditioning agent.

Another object of the present invention is to provide a process for producing a soil conditioner having a sugar cane bagasse base, which base is chemically uniform and stable and which can be produced more economically than bagasse soil conditioners heretofore proposed.

Another object of the invention is to provide a pumpable slurry containing a bagasse soil conditioner and wood cellulose fibers, and which can be effectively used for planting seeds or vegetative plant parts in great numbers in erosion control projects, grass establishment and reforestation.

In addition to the foregoing objects and advantages, additional advantages of the present invention will become apparent as the following detailed description of the invention is read.

The raw, cream-colored bagasse which constitutes the starting material used in the process of the present invention contains (on a dry basis), as has been indicated, a nitrogen content of from about 0.18 percent by weight to about 0.21 percent by weight, a phosphorus (expressed as $P_2O_5$) content of from about 0.05 percent by weight to about 0.09 percent by weight, a potash content (expressed as $K_2O$) of from about 0.18 percent to about 0.21 percent by weight, and a carbon content of approximately 40 percent by weight. The C–N ratio of this material therefore varies from about 220 to 1, to about 190 to 1. These values are average values since the chemical constitution of the raw bagasse is not uniform throughout the mass but may vary considerably within, and even to some extent outside, the specified limits.

Depending upon the extent of dehydration occurring in the sugar cane rendering process and subsequent exposure to moisture, the raw bagasse will contain from about 45 percent by weight to about 60 percent by weight of water. It is a bright cream color and its particle size ranges from relatively small particles to elongated coarse fibers several inches in length. Its pH is between 4.05 and 5.2.

In accordance with the process of the present invention, the bagasse, following sugar rendering, is compacted by a baling procedure in which the bagasse is compressed in generally rectangular bales preferably having an average size of about 30 inches in length by 25 inches in thickness by 30 inches in width. Each bale of this size will weigh approximately 150 pounds and the compression applied to the bagasse in forming the bale will amount to from about 100 p.s.i. to about 150 p.s.i.

The compacted baled bagasse is then stacked in piles, preferably outdoors, with the bales stacked on each other in a manner to permit free air circulation therebetween. After stacking the bales of bagasse in the described manner, the bagasse is permitted to cure or weather for a period of at least 30 days and until the moisture content thereof has reached a level of 20 percent by weight or lower. During this initial weathering period, the bagasse is partially chemically stabilized as a result of the partial dissipation of the sugar residues therein. The precise nature of the bacteriological and enzymatic action which occurs in the baled bagasse during this period is not exactly and completely understood. It is believed, however, to be primarily an anerobic process since the circulation of air to the interior of the bales is predominantly prevented by the particle size and extent of compression of the material. Highly exothermic enzymatic and bacterial action appears to occur which continues over the period of the weathering resulting in the partial depletion of the sugar and acid content of the bagasse.

Following the described initial weathering or curing period, the bagasse has undergone certain detectable changes in its chemical and physical character. The color of the material has changed from its initial cream color to a light brown, and the pH has been increased to between 4.5 and 6. The amount of free sugar and organic acid in the bagasse is substantially reduced and the phosphorus, expressed as phosphorus pentoxide, in the bagasse has been increased to slightly less than 0.1 percent. The potash content expressed as $K_2O$ is usually slightly less than 0.25 percent and the uniformity of distribution of the chemicals in the body of the bagasse is improved. The overall pentosan and lignin content of the material obtained appears to remain substantially constant. Its nitrogen content is increased to a range of from about 0.28 to about 0.35 weight percent, while the carbon content remains substantially constant so that a substantial reduction in the carbon to nitrogen ratio over that characteristic of the original bagasse is realized.

It may be appropriately stated at this point that all references to the phosphorus and potash content of bagasse appearing in the specification and appended claims of this application indicate these values as they are expressed as phosphorus pentoxide and potassium oxide as is customary in the analysis of fertilizers, soil conditioners and the like.

It should be pointed out that the stabilization of bacteriological and enzymatic action which is accomplished during the initial weathering period of the present process is not as advanced as the stability which is characteristic of the bagasse produced in the extended single weathering period used in the process described in the cited co-pending application. However, the general type of decreased activity, moisture loss, increase in pH and reduction in C–N ratio which is brought about by the longer period of weathering used in the process of the co-pending application is also characteristic of the initial weathering period used in the procedure of this invention, though in a lesser degree.

Upon completion of the initial weathering period during which the bales of bagasse are maintained in piles for a period of at least 30 days and until the moisture content of the bagasse is reduced to 20 percent or lower, the bales are subjected to a particle size homogenization procedure in which the bagasse is subjected to comminution using a hammer mill or other suitable device. The particle size reduction is such that at least 90 percent of the bagasse will pass a No. 4 Tyler screen. We have determined that hammer milling, which constitutes the preferred method of homogenization of particle size by comminution, does not produce an excessive quantity of fines and the size of the smaller particles of the bagasse which are subjected to the hammer milling process is not initially so small as to require removal from the final product by screening.

After reducing the size of the larger particles of bagasse so that substantially all of the particles will pass a No. 4 Tyler screen, the next step in the procedure is to add water to the bagasse particles to increase the overall moisture content to from about 40 percent to about 70 percent by weight. The water can be conveniently added to the bagasse by spraying the homogenized particles with a fine mist while agitating the particles. The moisturized particles are then subjected to a further weathering procedure by spreading the particles in either indoor or outdoor compacted piles using a pressure of from about 1 p.s.i.g. to about 5 p.s.i.g. on the piles of bagasse to achieve the desired extent of compaction. The moisturized piles of bagasse are preferably enclosed or located indoors since the amount of moisture content in the bagasse may thereby be better controlled and contamination of the moisturized bagasse by insects and vermin can be prevented.

The second weathering period which is carried out with the moisturized bagasse in compacted piles is carried on for a period of at least 30 days during which time the chemical stabilization of the bagasse is completed. At this point in the procedure, the bagasse chemically and physically resembles the bagasse prepared in the process described in said co-pending application by initially weathering the bagasse for a period of 70 days. Thus, the bagasse has undergone a further darkening in color to a medium brown, and the pH has been increased to the nearly neutral range of from about 6.3 to about 6.8. Very little or no free sugar or organic acid remains in the bagasse, and the nitrogen content is approximately doubled to a value of between about 0.38 percent by weight and about 0.45 percent by weight. The carbon content of the material remains at about 40 percent so that the final carbon to nitrogen ratio is about 100 to 1 in the weathered product. Phosphorus, expressed as phosphorus pentoxide, is increased to a content of between 0.09 percent by weight and 0.17 percent by weight, and the potash ($K_2O$ equivalent) content of material is increased to between about 0.28 percent by weight and 0.40 percent by weight. The overall pentosan and lignin content of the material appears to remain substantially constant. The moisture content of the bagasse upon completion of the weathering is from about 10 percent by weight to about 60 percent by weight and preferably is from about 30 percent by weight to about 40 percent by weight.

The final step of that aspect of the invention directed to producing a finished soil conditioner constitutes the addition to the dehydrated, homogenized bagasse of certain inorganic chemical materials which raise the nutrient content of the stabilized bagasse, and further lower the carbon to nitrogen ratio thereof. As a result of the essentially neutral hydrogen ion concentration of the added materials, the pH of the bagasse is not substantially changed by the addition of such materials. However, judicious selection of the nutrient containing chemicals which are added to the material can result in a slight adjustment of pH to whatever range is desired. In most instances, however, the pH of 6.3 to 6.8 which is obtained prior to the addition of the nutrients is satisfactory to permit use of the bagasse in the growth of most types of plants.

The addition of the plant nutrient containing chemicals to the homogenized, weathered bagasse may conveniently be accomplished by passing the material through agitating rotary conveyors between mechanical spraying equipment which sprays the nutrient containing additives into the bagasse at a controlled rate which is synchronized with the rate of movement of the bagasse by the conveyors. Blending of the added chemicals with the stabilized, homogenized bagasse material occurs through the continued conveyor agitation.

The nutrients are applied to the stabilized bagasse as a single-phase or dual-phase solution, and it is preferred to use a nutrient solution which will result in a product having a nitrogen content between 0.60 and 1.50 percent by weight, a phosphorus pentoxide (equivalent) content of between 0.30 and 1.0 percent by weight and a potash (equivalent) content of between 0.3 and 1 percent by weight. The most preferred final nutrient range of the product is from about 0.90 to about 1.0 percent by weight nitrogen, from about 0.45 to about 0.65 percent by weight phosphorus pentoxide and from about 0.45 to about 0.65 percent by weight potash. We have obtained good results using a non-pressure stable aqueous solution containing 10 percent by weight phosphorus pentoxide, 2.5 percent by weight potassium oxide and 15 percent by weight nitrogen. Suitable sources of nitrogen are ammonium phosphate, ammonium nitrate, ammonium sulfate and urea. Other nitrogen sources can also be used. The solute which contributes the potash is potassium chloride.

Since the carbon content of the stabilized bagasse is not changed by the addition of the nutrient containing inorganic solution, the increase in the nitrogen content of the material effectively reduces the carbon to nitrogen ratio to about 40 to 1. Although this carbon to nitrogen ratio is slightly higher than is most often conceived to be optimum to completely eliminate robbing the nitrogen from the soil by soil organisms, the slight insufficiency of nitrogen indicated by the 40 to 1 carbon to nitrogen ratio is offset by the amount of the nitrogen which is present in readily available form. This relatively high concentration of readily available nitrogen is attained by virtue of the ready availability which characterizes the inorganic nitrogen added by the last step of the process to the stabilized bagasse. The same characteristic of availability characterizes the other nutrients, such as phosphorus and potash, which are added to the stabilized bagasse in an inorganic form. The 40 to 1 carbon to nitrogen ratio is sufficiently low, however, to leave a substantial amount of beneficial humus upon further bacteriological decomposition of the soil conditioner over extended periods of time after it has been mixed with the soil.

We have further determined that when the nitrogen content of the finished material is adjusted to fall within the specified range, there is no problem of having an excessively large amount of nitrogen present in the material so as to overstimulate the soil organisms, causing them to produce excessive amounts of ammonia and thus create an injurious environment for plant life. It may also be noted that the nitrogen which is present in the stabilized bagasse prior to the addition of the readily available inorganic nitrogen is more tightly bound chemically in the bagasse structure, and therefore is sufficiently slowly released to enable the finished product to continue to supply nitrogen to beneficial soil organisms over an extended period of time.

In summary, the amount of readily available nitrogen which is added to the stabilized bagasse, the slowly releasable nitrogen which is present in the stabilized bagasse before such addition, and finally, the near optimum carbon to nitrogen ratio of the finished material all assure continuous orderly activity of beneficial soil organisms over extended periods of time.

As an additional measure which may be added to the process for the purpose of insuring retention of the moisture content of the finished soil conditioner product at the desired level, the material may be hydraulically compressed into bags which are lined with polyethylene so as to minimize moisture loss during transshipment. In this way, a minimum moisture loss from the time of bagging until the time of ultimate use can be assured and the product thus made available in a slightly moist, dust-free form.

The finished product consists of at least 95 percent by weight organic material with the remainder constituting an inorganic material present primarily as a result of the introduction of the nutrients in the manner described.

Tests of the stabilized bagasse soil conditioner prepared by the improved process of the present invention indicate that the material produced by the process of the invention is at least as effective as the bagasse base soil conditioner produced by the basic process described in our copending application, and that the soil conditioner yields a definite improvement in plant growths in soils to which it is added.

As another aspect of the present invention and as a step alternative or subsequent to the addition of inorganic plant nutrients to the homogenized, weathered bagasse, we have found that the bagasse may be combined with a wood cellulose fiber to produce a composition which is highly useful for grass and tree establishment. The type of wood cellulose fiber which is employed in this embodiment of the invention is made from virgin wood pulp which has been finely comminuted and mixed with water to form a homogeneous aqueous slurry. The wood fibers used are preferably derived from southern pine and are first-line, washed fibers similar to those used in the paper making industry. The slurry normally contains at 90 percent by weight water and about 1 to about 10 percent by weight cellulose fibers. An especially useful and effective slurry contains about 96 weight percent water and about 4 weight percent cellulose fibers. An example of a wood cellulose fiber slurry of this type is the product sold under the tradename Turfiber by the International Paper Company of New York, N.Y.

In preparing the seeding, vegetative part planting and erosion control composition of the present invention, the wood cellulose fiber slurry is mixed with the homogenized, weathered bagasse by slowly adding from about 25 percent by weight to about 75 percent by weight of the bagasse to the cellulose fiber slurry. Where the composition is to be used for planting of trees, grass or other plant life, the amount of the bagasse soil conditioner added to the cellulose fiber slurry is preferably about 50 percent by weight. The seeds or vegetative plant parts which are to be distributed in the composition are then added to the mixture and thoroughly dispersed therein by agitation.

Although wood cellulose fiber slurries have been previously used with a degree of success, difficulty has been experienced in uniform matting and adhesion on the soil to which applied. We have found that mixing of the bagasse soil conditioner with the wood cellulose slurry in the proportions described greatly reduces the erosion which occurs when the wood cellulose slurry alone is used, promotes the growth of seeds and vegetative parts carried by the composite slurry and enhances the tenacity with which the composite slurry can be expected to adhere. The bagasse soil conditioner can be added either in the unenriched, base form, i.e., without the added inorganic nutrients, or it can be added in its finished, nutrient-enriched form.

Although certain preferred embodiments of the invention have been hereinbefore described as exemplary of its practice, it will be understood and appreciated by those skilled in the art that certain modifications and innovations may be indulged in the prescribed procedure, and in the types of materials used, without departure from the basic principles underlying the invention. It is therefore intended that insofar as the production of a soil conditioning material from bagasse continues to rely upon the fundamental novel concepts which are herein presented, the introduction to the practice of the process of such modifications and innovations shall not serve to remove such practice from the pale of the spirit and scope of the invention except as the same may be limited by the appended claims or reasonable equivalents thereof.

We claim:

1. The method of producing a soil conditioning composition which comprises:
   compressing sugar cane bagasse into bales;
   weathering said bales for a period of at least 30 days and until the moisture content of the bagasse does not exceed 20 percent by weight;
   comminuting the weathered bagasse so that substantially all of the bagasse will pass a No. 4 Tyler screen;
   adding water to the bagasse to achieve a relatively uniform moisture content therein of from about 40 percent by weight to about 70 percent by weight;
   weathering the bagasse in compacted piles for a period of at least 30 days and until the moisture content of the bagasse decreases to a level of from about 30 percent by weight to about 60 percent by weight, then adding inorganic, plant nutrient containing chemicals selected from the group consisting if nitrogenous compounds, phosphorus containing compounds and mixtures of said compounds to the comminuted, weathered bagasse to adjust the chemical content thereof on a dry basis to from about 0.6 to about 1.5 percent by weight nitrogen; about 0.3 to about 1 percent by weight phosphorus pentoxide, and about 0.3 to about 1 percent by weight potash.

2. The method claimed in claim 1 wherein said bagasse is subjected to a pressure of from about 100 p.s.i. to about 150 p.s.i. during said baling process.

3. The method claimed in claim 1 wherein the second weathering of said bagasse after comminuting and adding water to the bagasse, the bagasse is weathered for a period of at least 30 days and until the moisture content thereof is from about 30 percent by weight to about 40 percent by weight.

4. The method claimed in claim 1 wherein said bagasse is comminuted by subjecting the bagasse to hammer milling.

5. The method claimed in claim 1 wherein said inorganic plant nutrient containing chemicals are added to said comminuted, weathered bagasse in an amount sufficient to bring the dry basis chemical content thereof to from about 0.90 to about 1.0 percent by weight nitrogen, from about 0.45 to about 0.65 percent by weight phosphorus and from about 0.45 to about 0.65 by weight potash.

6. The method of producing an erosion preventing composition which comprises:

compressing sugar cane bagasse into bales;
weathering said bales for a period of at least 30 days and until the moisture content of the bagasse does not exceed 20 percent by weight;
comminuting the weathered bagasse so that substantially all of the bagasse will pass a No. 4 Tyler screen;
adding water to the bagasse to achieve a relatively uniform moisture content therein of from about 40 percent by weight to about 70 percent by weight;
weathering the bagasse in compacted piles for a period of at least 30 days and reducing the moisture content of the bagasse to a level of from about 30 percent by weight to about 60 percent by weight, then
adding inorganic, plant nutrient containing chemicals selected from the group consisting of nitrogenous compounds, phosphorus containing compounds and mixtures of said compounds to the comminuted, weathered bagasse to adjust the chemical content thereof on a dry basis to from about 0.6 to about 1.5 percent by weight nitrogen; about 0.3 to about 1 percent by weight phosphorus pentoxide, and about 0.3 to about 1 percent by weight potash; then
mixing said plant nutrient containing bagasse with an aqueous slurry consisting essentially of water and wood cellulose fibers to provide a slurry containing from about 1 percent by weight to about 3 percent by weight of the nutrient containing bagasse.

7. The method of producing an erosion preventing composition which comprises:

compressing sugar cane bagasse into bales;
weathering said bales for a period of at least 30 days and until the moisture content of the bagasse does not exceed 20 percent by weight;
comminuting the weathered bagasse so that substantially all of the bagasse will pass a No. 4 Tyler screen;
adding water to the bagasse to achieve a relatively uniform moisture content therein of from about 40 percent by weight to about 70 percent by weight;
weathering the bagasse in compacted piles for a period of at least 30 days and reducing the moisture content of the bagasse to a level of from about 30 percent by weight to about 60 percent by weight, then
mixing said comminuted, weathered bagasse with an aqueous slurry consisting essentially of water and wood cellulose fibers to provide a slurry containing from about 1 percent by weight to about 3 percent by weight of the nutrient containing bagasse.

References Cited
UNITED STATES PATENTS 3,163,517   12/1964   May et al. _____ 71—26

DONALL H. SYLVESTER, *Primary Examiner.*

R. BAJEFSKY, *Assistant Examiner.*